Feb. 12, 1929.
I. WESTON
PASTRY BOARD
Filed July 30, 1927
Fig. 1.
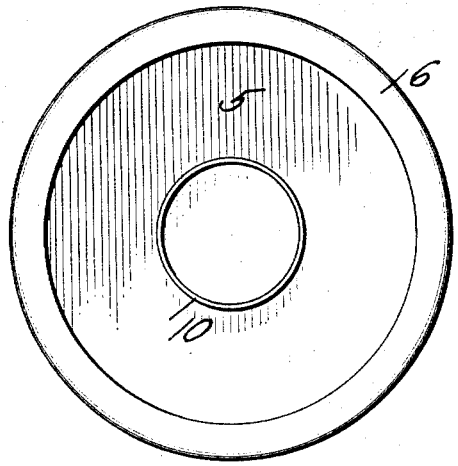
Fig. 2.
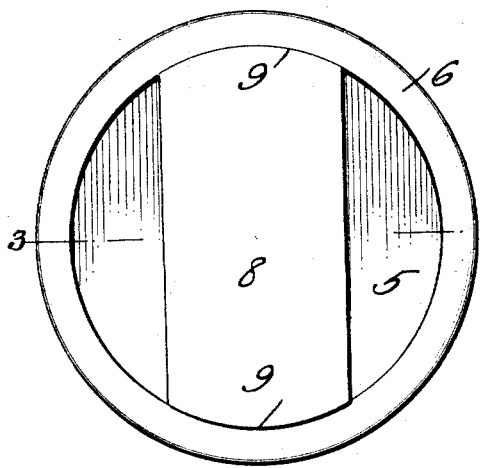
Fig. 3.
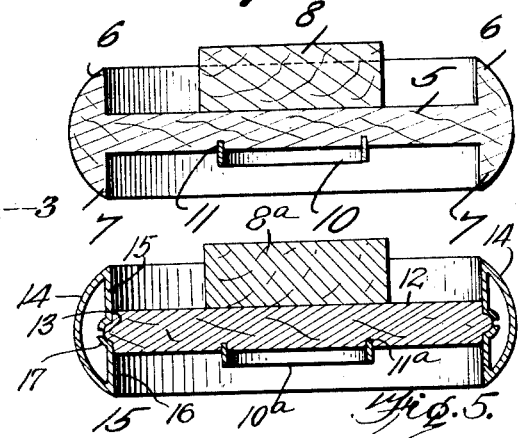
Fig. 5.
Fig. 4.
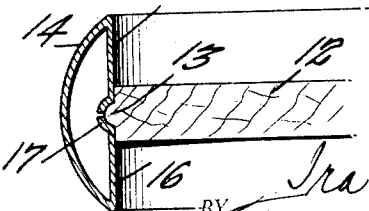
INVENTOR.
Ira Weston,
BY
ATTORNEY.

Patented Feb. 12, 1929.

1,702,144

UNITED STATES PATENT OFFICE.

IRA WESTON, OF PUEBLO, COLORADO.

PASTRY BOARD.

Application filed July 30, 1927. Serial No. 209,535.

This invention relates to pastry boards, and has for an object the provision of a board which can be utilized for mixing pastry and for cutting the same into appropriate thickness for use as pie crusts or the like; and the invention furthermore includes novel means for facilitating the cutting of vegetables for salad, or the slicing of bread, the same being associated with means for holding the cuttings and preventing the scattering of the same.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a plan view of one side of the pastry board;

Figure 2 illustrates a plan view of the opposite side thereof;

Figure 3 illustrates a sectional view on the line 3—3 of Fig. 2;

Figure 4 illustrates a sectional view of a modified construction; and Figure 5 illustrates a sectional view of the modified form on a reduced scale, showing the instrumentalities associated with the board.

In that form of the invention shown in Figs. 1, 2 and 3, the board 5 has an annular flange 6 on one side and an annular flange 7 on the other side and these are formed, in the present embodiment of the invention, integral with the said board, although obviously, the board may be provided with a rim forming the flanges. One side of the board is intended to receive dough to be kneaded and the other side has a dough cutting ring into which dough may be pressed in forming pie crusts or the like.

A block 8 has curved ends, such as 9, conforming to the curve of the inner surface of the flanges and the block is of such dimensions as to fit between said flanges. The block is intended as a cutting support on which bread or vegetables can be cut and the vegetables can be lodged at the sides of the block within the flange so as to prevent the same from scattering. While bread is being cut, the crumbs will be collected at the side of the block on the kneading board.

The side having the block 8 can also be used as a mixing container where the vegetables after they have been cut on the block 8 may be mixed with salad dressings or the like, it being understood, of course, that the block will be removed during the mixing operations. The ingredients of the salad dressing, even though onion or highly flavored seasoning, would not contaminate the opposite side of the board which is used for mixing dough, so that the device is of great utility and has a variety of uses as a kitchen article.

When the pastry is being kneaded, it can be accomplished by manipulating the kneading board on the mixture confined by the flanges, and if the pastry is to be cut to be used as a pie crust, it may be pressed into the ring 10 which has one edge imbedded in an annular slot 11 in the board, it being shown that the said ring projects a suitable distance beyond the surface of the board, and the depth of the ring or flange from the board will determine the thickness of the layer to be cut. In cutting the pastry, it would be pressed into the ring and any excess of pastry above that required to fill the ring would be dislodged in the space by the ring and the operation could be repeated until such numbers as are required are produced.

The kneading board when placed on the plane side of the pastry board may be used as a support for vegetables that are being sliced, or it could support bread while being cut, and the sliced vegetables would lodge in the board inside of the flange where they could be collected for use, and the crumbs from bread being cut would also lodge at the side of the kneading board within the space outlined by the flange and this would prevent the crumbs from being unduly disturbed.

It is shown in the drawing that the kneading board is thicker than the depth of the flanges and this insures a free manipulation of the cutting instrument during the slicing or cutting operation without liability of the said instrument coming in contact with the edges of the flanges.

In Fig. 4, there is shown a slightly modified construction, in which the pastry board 12 has an annular bead 13 for engaging a metal rim 14 which forms the flanges. It is shown in the drawing that the rim has a convex outer wall with converging inner walls forming flanges 15 and 16 and it also shows a joint 17 between the edges of the converging flanges. It is the purpose of the inventor that this rim shall be made of rather rigid and yet slightly resilient material in order that when the rim is shaped, the flanges of the rim may be sprung into place on the periphery of the pastry board and be held thereon by friction. The pastry board of this embodiment is provided with a block 8ª similar to the block 8, and a ring 10ª located in a seat 11ª, and these elements will have the same relation to the board and perform the functions as the like parts described in connection with Fig. 3.

I claim:

1. A pastry board having oppositely disposed marginal flanges, a cutting block having its ends shaped to the contour of the inner surfaces of the flanges, the said cutting block being of greater thickness than the depth of the flanges.

2. A pastry board having oppositely disposed marginal flanges, a cutting block having its ends shaped to the contour of the inner surfaces of the flanges, the said cutting block being of greater thickness than the depth of the flanges, and a cutter imbedded in the board on one side and projecting outwardly from the surface in which the cutter is imbedded.

3. In a pastry board, a board having a marginal bead, a rim having converging flanges whose edges are shaped to engage the bead of the board whereby the rim is held on the board.

4. In a pastry board, a board having a peripheral bead, a rim having converging portions forming flanges, said converging portions having a loose joint therebetween adapted to resiliently engage the beaded periphery of the said board.

IRA WESTON.